United States Patent
Sanders et al.

(10) Patent No.: US 7,388,671 B2
(45) Date of Patent: Jun. 17, 2008

(54) POLARIZING CAVITY FOR RFOG AND METHOD FOR SENSING ROTATION RATE OF RESONATOR

(75) Inventors: Glen Aaron Sanders, Scottsdale, AZ (US); Lee Kevin Strandjord, Tonka Bay, MN (US)

(73) Assignee: Honeywell International, Inc., Morristown, NJ (US)

( * ) Notice: Subject to any disclaimer, the term of this patent is extended or adjusted under 35 U.S.C. 154(b) by 291 days.

(21) Appl. No.: 11/253,484

(22) Filed: Oct. 18, 2005

(65) Prior Publication Data

US 2007/0086015 A1 Apr. 19, 2007

(51) Int. Cl.
*G01C 19/64* (2006.01)
(52) U.S. Cl. .................................... 356/461
(58) Field of Classification Search ............... 356/461, 356/470
See application file for complete search history.

(56) References Cited

U.S. PATENT DOCUMENTS

| | | | | | |
|---|---|---|---|---|---|
| 4,135,822 | A | * | 1/1979 | Ezekiel | 356/461 |
| 4,274,742 | A | * | 6/1981 | Lustig | 356/470 |
| 4,429,573 | A | * | 2/1984 | Walker | 356/461 |
| 5,137,356 | A | * | 8/1992 | Malvern | 356/461 |
| 5,349,441 | A | * | 9/1994 | Sanders | 356/461 |
| 5,394,242 | A | * | 2/1995 | Porter | 356/461 |
| 2004/0061863 | A1 | * | 4/2004 | Digonnet | 356/460 |
| 2004/0263856 | A1 | | 12/2004 | Wilig et al. | |

FOREIGN PATENT DOCUMENTS

GB 2 230 600 A 10/1990

OTHER PUBLICATIONS

International Search Report dated Feb. 3, 2007 for International application No. PCT/US2006/04327.

* cited by examiner

*Primary Examiner*—Samuel A Turner
(74) *Attorney, Agent, or Firm*—Black Lowe & Graham PLLC

(57) ABSTRACT

Methods and apparatus are provided for attenuating polarization errors in ring resonators of fiber optic gyros. A ring resonator is provided having first and second resonance frequencies and comprising an optical fiber coil having a hollow core and first and second ends, a light beam generator coupled to the optical fiber coil and configured to generate first and second counter-propagating beams in the hollow core, and a light recirculator coupled to the first and second ends of the optical fiber coil and configured to direct a first light beam exiting the first end of the optical fiber coil into the second end of the optical fiber coil. The first light beam is based on one of the first and second counter-propagating beams. The light recirculator comprises a first polarizing unit configured to reflect a first polarized component of the first light beam and further configured to extract a second polarized component of the first light beam.

20 Claims, 2 Drawing Sheets

POLARIZING CAVITY FOR RFOG AND METHOD FOR SENSING ROTATION RATE OF RESONATOR

FIELD OF THE INVENTION

The present invention generally relates to gyro systems, and more particularly relates to rotational sensors for use in a fiber optic gyro.

BACKGROUND OF THE INVENTION

Gyros have been used to measure rotation rates or changes in angular velocity about an axis. A basic conventional fiber optic gyro (FOG) includes a light source, a beam generating device, and a coil of optical fiber coupled to the beam generating device that encircles an area. The beam generating device transmits light beams into the coil that propagate in a clockwise (CW) direction and a counter-clockwise (CCW) direction along the core of the optical fiber. Many FOGs utilize glass-based optical fibers that conduct light along a solid glass core of the fiber. The two counter-propagating (e.g., CW and CCW) beams experience different pathlengths while propagating around a rotating path, and the difference in the two pathlengths is proportional to the rotational rate.

In a resonator fiber optic gyro (RFOG), the counter-propagating light beams are desirably monochromatic (e.g., in a single frequency) and recirculate through multiple turns of the fiber optic coil and for multiple passes through the coil using a recirculating device such as a fiber coupler. The beam generating device modulates and/or shifts the frequencies of each of the counter-propagating light beams so that the resonance frequencies of the resonant coil may be observed. The resonance frequencies for each of the CW and CCW paths through the coil are based on a constructive interference of successively recirculated beams in each optical path. A rotation of the coil produces a shift between in the respective resonance frequencies of the resonant coil and the frequency difference, such as may be measured by tuning the CW beam and CCW beam frequencies to match the resonance frequency shift of the coil due to rotation, indicates the rotation rate.

The RFOG may encounter a variety of anomalies that decrease the accuracy of the rotational rate measurement. Polarization-induced errors are initiated by light coupling from one polarization state to another within the fiber resonator. For instance, such light coupling may result from fiber couplers that incidentally couple light into a second polarization mode, either from one optical fiber to an adjacent optical fiber or within the same fiber. As a result, the second polarization mode has a resonance that may produce an asymmetry in the resonance lineshape of the first polarization mode used to measure a rotation. Even though the resonance frequency of the second polarization mode may be the same for the CW and CCW beams, the amplitude of light in such mode may be different, thus causing different observations, beyond the effect of rotation, of the resonance frequencies of the CW and CCW beams. Polarization-induced errors may severely limit the accuracy of the RFOG because determination of the resonance centers for each of the resonance frequencies of the CW and CCW beams directly affects the rotational rate measurement. The errors in the gyro generally depend on the magnitude of light propagating in the second polarization state.

Several mechanisms may couple light into the undesired polarization state of the fiber optic resonator. In general, light traveling in the undesired polarization state results from a combination of these mechanisms. As previously mentioned, light may be cross-coupled inside the re-circulating device, such as a fiber coupler. Light may also excite the second polarization state, or couple into the second polarization state, of the resonator when undesirably injected into the optical fiber with a component of the light in the undesired polarization state. This may be exacerbated by possible variances in the states of polarization of the fiber inside the resonator due to temperature or stress variation, thereby making repeated light launches into one polarization state of the resonator more difficult. Even if the lights beams are originally introduced to the coil of the RFOG in the first polarization mode, the optical fiber may have one or more imperfections that couple light into the second polarization mode. One way of limiting such cross-talk between polarization modes of the fiber resonator is to employ polarization preserving fiber. Polarization preserving fiber incorporates stresses defining different speeds of light (i.e., birefringence) that attenuate the cross-coupling of light from one polarization axis of the fiber to the other. This feature of polarization preserving fiber stabilizes the polarization mode of the ring resonator, thereby assisting the task of stably launching a fraction of light into a desired mode.

Using conventional optical fibers, particularly in polarization preserving fibers, the difference in the speed of light between light traveling on the two principle axes of polarization in the fiber typically varies with temperature. This variation can cause the relative resonance frequencies of the two polarization states to vary with temperature. In some instances, the resonance frequency of the undesired polarization state may coincide with the resonance frequency of the desired polarization state under some environmental conditions.

Polarization-induced errors may severely limit the accuracy of the RFOG because the accuracy of the determination of the resonance centers, and thus the resonance frequencies in the CW and CCW directions, directly affects the rotational rate measurement. Additionally, these errors in the measurement may change radically with respect to the temperature in conventional optical fibers due to the sensitivity of the associated birefringence to temperature.

Consequently, the gyro output may drift without influence from a variation in rotation rate. Thus, two primary error mechanisms are the excitation of light in the undesired polarization state, and the environmental instability of the resonance frequency of the undesired polarization state relative to that of the desired polarization state. Additional error mechanisms in an RFOG employing conventional glass fibers that are attributable to the propagation of light in the solid glass medium of the optical fiber include optical Kerr Effect, Stimulated Brillouin Scattering, and Raleigh back-scattering.

Accordingly, it is desirable to provide a fiber optic gyro that attenuates polarization errors in rotational rate measurements. In addition, it is desirable to provide a method for attenuating polarization errors in rotational rate measurements of a fiber optic gyro. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Methods and apparatus are provided for sensing a rotational rate of a ring resonator about an axis. In an exemplary embodiment, a ring resonator is provided having first and second resonance frequencies and comprising an optical fiber coil having a hollow core and first and second ends, a light beam generator coupled to the optical fiber coil and configured to generate first and second counter-propagating beams in the hollow core, and a light recirculator coupled to the first and second ends of the optical fiber coil and configured to direct a first light beam into the second end of the optical fiber coil. The first light beam is based on one of the first and second counter-propagating beams. The light recirculator comprises a first polarizing unit configured to direct with a low loss a first polarized component of the first light beam into the second end and further configured to impart a high loss to a second polarized component of the first light beam.

In another exemplary embodiment, a resonator fiber optic gyro (RFOG) assembly is provided comprising a beam generator, an optical fiber coil having first and second ends coupled to the beam generator and having a hollow core, a polarizing unit coupled to said first and second ends of said optical fiber coil, a first photodetector configured to determine a resonance center of the first light beam based on the first polarized light component, a second photodetector configured to determine a resonance center of the second light beam based on the first polarized light component, and a frequency shifter coupled to the second photodetector. The beam generator is configured to produce first and second counter-propagating light beams in the optical fiber coil, and each of the first and second counter-propagating light beams has a frequency. The polarizing unit is configured to reflect a first polarized light component of the first and second counter-propagating light beams, pass a second polarized light component of the first and second counter-propagating light beams, and recirculate the first and second counter-propagating light beams through the optical fiber coil. The frequency shifter is configured to shift the frequency of the second light beam by a frequency $\Delta f$ to the resonance center of the second light beam. The frequency $\Delta f$ indicates a rotational rate of the RFOG.

In another exemplary embodiment, a method for sensing a rotation rate of a ring resonator having a hollow core optical fiber is provided comprising the steps of transmitting first and second counter-propagating light beams into the hollow core optical fiber, recirculating the first and second counter-propagating light beams through the hollow core optical fiber while substantially removing a first polarized light component out of each of the first and second counter-propagating light beams, and measuring a frequency shift between a resonance frequency of the first counter-propagating light beam and a resonance frequency of the second counter-propagating light beam. The frequency shift indicates the rotation rate.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
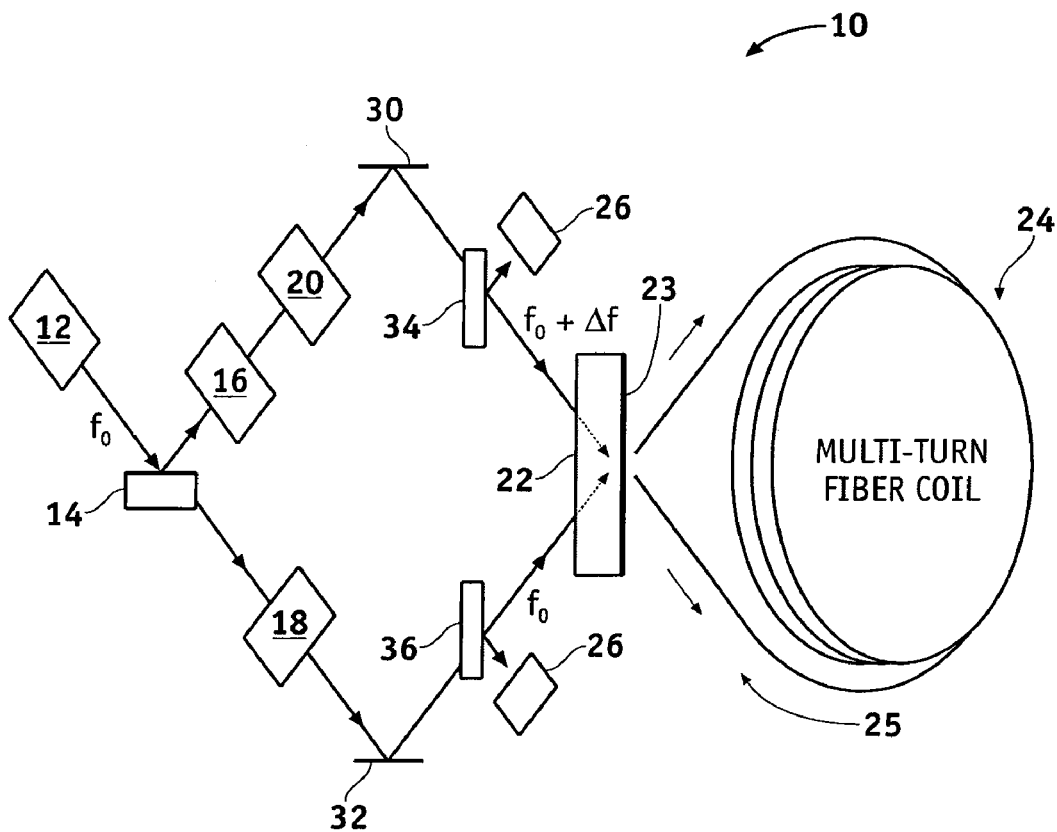
FIG. 1 is a schematic diagram of a resonator fiber optic gyro in accordance with an exemplary embodiment of the present invention.

Referring now to the drawings, FIG. 1 is a schematic diagram of a resonator fiber optic gyro (RFOG) 10 in accordance with an exemplary embodiment of the present invention. The RFOG 10 comprises a tunable light source 12 (e.g., a laser) configured to generate a light beam having a frequency $f_0$, a beam splitter 14 configured to receive the light beam from the light source 12 and further configured divide the light beam from the light source 12 into first and second light beams, a first wave modulator 16 configured to receive the first light beam from the beam splitter 14 and further configured to modulate the first modulated light beam, a second wave modulator 18 configured to receive the second light beam from the beam splitter 14 and further configured to modulate the second light beam, a frequency shifter 20 configured to receive the first modulated light beam from the first wave modulator 16 and further configured to shift the frequency of the first modulated light beam, a recirculator 22 configured to receive the first modulated light beam from the frequency shifter 20 and the second modulated light beam from the second wave modulator 18, a hollow core optical fiber coil 24 having first and second ends coupled to the recirculator 22, a first photodetector 26 configured to receive a first return beam from the recirculator, and a second photodetector 28 configured to receive a second return beam from the recirculator 22. The combination of the recirculator 22 and the fiber coil 24 is referred to as a resonator 25. The recirculator 22 is further configured to introduce the modulated light beams to the optical fiber coil 24 and recirculate the modulated light beams through the optical fiber coil 24. The RFOG 10 may include additional mirrors 30, 32 and beam splitters 34, 36 for directing the propagation of light beams from the light source 12 to the optical fiber coil 24 and for directing light from the recirculator 22 to the photodetectors 26, 28.

In an exemplary embodiment, the light source 12 is a single frequency tunable laser having frequency stability, substantially narrow line width, and relatively high power capability. The wave modulators 16, 18 frequency-modulate the first and second light beams such as by introducing a sinusoidal waveform into the light beams, and the particular modulation may be selected to improve sensitivity of the RFOG 10 to a detected frequency shift ($\Delta f$), described in greater detail herein below. The first modulated light beam and second modulated light beam are introduced into the optical fiber coil 24 in a counter-clockwise (CCW) and a clockwise (CW) direction, respectively, such as via opposite ends of the optical fiber coil 24.

The CW beam has an unshifted laser frequency ($f_0$) and is introduced into the resonator 25. For rotation sensing, the frequency $f_0$ of the CW beam is tuned (e.g., by tuning the frequency of the laser 12) to the resonance frequency of the resonator 25 in the CW direction. The frequency shifter 20 is configured to tune the frequency $\Delta f$ to align the CCW beam frequency with a resonance center relative to the resonance frequency of the resonator in CCW direction. During rotation sensing, the frequency shifter 20 frequency shifts the light from the laser 12 by an amount $\Delta f$ and injects the frequency shifted light into the optical fiber coil 24 in the CCW direction. Two methods of accomplishing a frequency shift include the use of an acousto-optic frequency shifter and the use of a phase modulator with a serrodyne modulation waveform. In the latter method, the serrodyne waveform is a form of a sawtooth waveform. To apply a relatively pure frequency shift, the phase shift amplitude of the sawtooth waveform, described in greater detail hereinafter, is set to an integer multiple of $2\pi$ and the sawtooth waveform has a substantially fast flyback time when compared to its period.

To measure the resonance center-frequencies of the optical fiber coil 24, in either the CW direction or CCW direction, a standard synchronous detection technique is used. Each input light beam (e.g., CW beam and CCW beam) is sinusoidally phase-modulated, and therefore frequency modulated at frequencies $f_m$ and $f_n$, respectively, to dither each input beam frequency across a resonance lineshape as measured by the photodetectors 26, 28. For example, additional circuitry coupled to the photodetectors 26, 28 may demodulate the outputs of the photodetectors 26, 28 at frequencies $f_m$ and $f_n$, respectively, to measure resonance centers indicated by the light outputs of the CW and CCW beams. At a line center of the resonance lineshape, or the resonance center, the photodetectors 26, 28 detect a minimum output at the fundamental detection frequencies $f_m$ and $f_n$, respectively. When the input beam frequency (e.g., $f_0$ or $f_0+\Delta f$) is off-resonance, an error signal at frequencies $f_m$ and $f_n$, respectively, is sensed by the photodetectors 26, 28 and used to tune the respective beam frequency to the respective resonance frequency of the optical ring resonator 25. The frequency of the CW beam is tuned by changing the frequency of the laser, $f_0$, and the frequency of the CCW beam is adjusted via a feedback loop that changes the frequency shift of the frequency shifter, $\Delta f$, so that $f_0+\Delta f$ matches the CCW resonance frequency of the optical ring resonator 25.

When $f_0$ is tuned away from the resonance frequency of the resonator 25 in the CW direction, the energy from the CW beam does not enter the optical fiber and the light is reflected off the highly reflective mirror 22 to produce a maximum intensity at the CW photodetector 26. When $f_0$ is tuned at the resonance frequency of the resonator 25 in the CW direction, the CW beam enters the optical fiber coil 24, and the light striking the CW photodetector 26 has a minimum output, i.e., a resonance dip, thereby indicating the resonance center. Similarly for the CCW light beam, the energy of the CCW beam enters the optical fiber coil 24 when the CCW beam is tuned to the resonance frequency of the resonator 25 in the CCW direction.

In the absence of rotation, the round-trip path-lengths of the CW and CCW beams inside the resonator 25 in the CW and CCW direction, respectively, are substantially equal. Thus, $\Delta f$ is tuned to zero by the frequency shifter 20. In the presence of rotation, the round-trip path-lengths differ between the CW and the CCW directions producing a resonance frequency difference between the two directions that is proportional to the rotation rate. By tuning the frequency $f_0$ to track the CCW resonance and the frequency $\Delta f$ to track the CCW resonance center, the rotation rate is determined.

In a preferred exemplary embodiment of RFOG 10, frequency shifting is obtained using a serrodyne method whereby a phase ramp is applied to an input light beam (e.g., CW and CCW beams). By driving a phase modulator, such as the wave modulators 16, 18, with a continuous and linear phase ramp, a frequency shift may be obtained, that is proportional to the slope of the phase ramp. A sawtooth waveform of having a $2\pi$ phase height and a frequency $\Delta f$ produces substantially equivalent results as the continuous ramp, and the sawtooth frequency ($\Delta f$) is adjusted to track the CCW resonance in the presence of rotation. As previously mentioned, the frequency shifter 20 may apply a relatively pure frequency shift when the sawtooth waveform flyback time is substantially fast compared to the waveform period.

A hollow core, band-gap, optical fiber having an extremely low bend loss is preferably used with the resonator 25, and the coil 24 preferably has a large number of turns about a substantially small area to achieve a compact gyro which is one advantage of this invention. For example, the coil 24 may have from about 20-40 turns of the optical fiber about a one centimeter diameter. The hollow core optical fiber is typically glass-based with a plastic outer jacket and a hollow inner core. In the hollow core optical fiber, light injected from the recirculator 22 traverses mostly through free space (e.g., air or a vacuum) along the core, and only about a few percent or less of the optical energy of light is contained in the glass walls of the fiber surrounding the hollow core. Because a large majority of the light energy traverses through free space along the hollow core of optical fiber, the transition between the recirculator 22 and the hollow core optical fiber has a near-perfect index matching, and a high reflectivity laser mirror with low loss and attractive polarization properties may be used for the recirculator 22. The hollow core fiber is suited to significantly attenuate, or eliminate altogether, the rotation measurement errors commonly associated with the properties of the glass medium in the core of conventional fibers.

The recirculator 22 reintroduces light emerging from one end of the optical fiber coil 24 into the other end of the fiber coil 24, thus causing light to propagate through the fiber coil 24 many times. The recirculator 22 comprises at least one polarization unit 23 that attenuates light emerging from the optical fiber coil 24 having an undesired polarization state while minimizing losses of a desired polarization state in the light emerging from the optical fiber coil 24. The polarization unit 23 reflects light in the desired polarization state (e.g., S-polarization) back into the optical fiber coil 24 to a substantially high degree (e.g., about 95% or more) and passes light in the undesired polarization state (e.g., P-polarization) out of the optical fiber coil 24 (e.g., removes light in the undesired polarization state from the light recirculating in the optical fiber coil 24) to a substantially high degree. The recirculator 22 may comprise a single polarization unit to receive/reflect light exiting from the ends of the optical fiber coil 24 or may comprise a network of two or more optical elements with multiple polarization units to separately receive/reflect light exiting from each end of the optical fiber coil 24.

In an exemplary embodiment, the polarization unit has a Brewster angle of incidence (e.g., about 56°), for light impinging on the main surface (e.g., the surface receiving light exiting from the optical fiber coil 24) of the polarization unit 23, at which S-polarized light is reflected at a substantially high degree and P-polarized light is passed out of resonator 25 at a substantially high degree. In this exemplary embodiment, the polarization unit 23 preferably receives light from the ends of the optical fiber coil 24 at this Brewster angle of incidence. One example of the polarizing unit 23 is a thin film polarizer that comprises a glass substrate having a coating (e.g., a stack of dielectric coatings), although a variety of other reflective devices having polarization sensitivity may be used. In conjunction with the hollow core optical fiber, light recirculating in the optical fiber coil 24 having the desired polarization may have a significantly low loss when propagating from the hollow core fiber into free space and then reflected by the polarization unit 23. Additionally, by using hollow core fiber that substantially maintains the state of polarization of light, or high birefringence hollow core optical fiber, the polarization state of the light inside the optical fiber may be oriented and maintained relative to the polarization state of the light reflected by polarization unit 23. Thus, losses associated with the desired polarization state are minimized, and the error in the rotation rate measurement due to the resonance magnitude of the undesired polarization state may be minimized. Further, the use of hollow core fiber significantly reduces the temperature dependence of the birefringence which allows for a stable resonance frequency separation between the desired polarization state and the residual undesired polarization state. Consequently, the use of hollow core fiber reduces errors in rotation rate over a wider variety of environmental conditions. Light guiding hollow core fiber may be realized via an optical bandgap effect in photonic crystal fiber structures and is frequently referred to as bandgap fiber.

Figure 2:
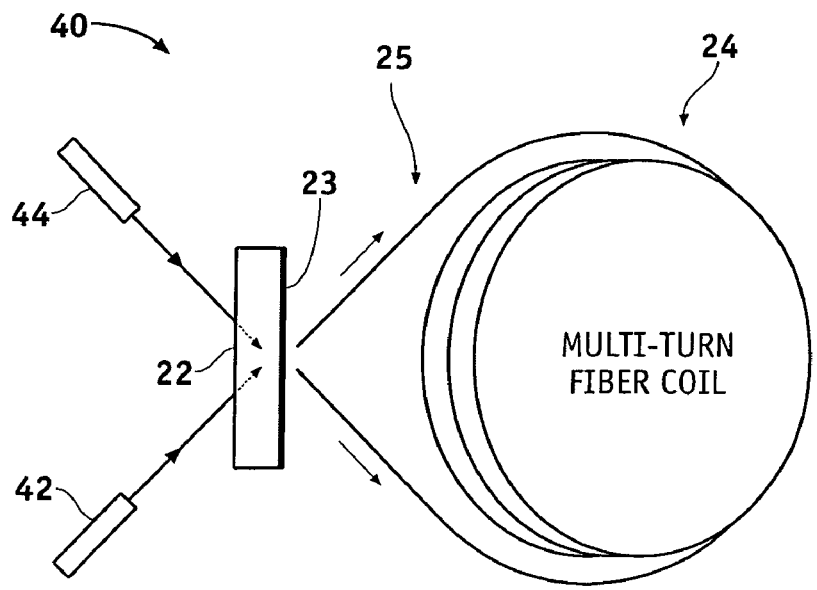
FIG. 2 is a schematic diagram of a resonator fiber optic gyro in accordance with another exemplary embodiment of the present invention.

FIG. 2 is a schematic diagram of a resonant fiber optic gyro 40 in accordance with another exemplary embodiment of the present invention. The RFOG 40 includes first and second tunable lasers 42, 44 that each synthesize the CW and CCW light beams, respectively, and introduce the light beams into the resonator 25 thereby replacing the beam splitter 14 shown in FIG. 1. The resonator 25 includes the recirculator unit 22 and the optical fiber coil 24, and the recirculator unit 22 includes a polarization unit 23. The light beam produced by the first laser 42 is tuned to a frequency $f_0$, and the light beam produced by the second laser 44 is tuned to a frequency $f_0+\Delta f$ thereby replacing the frequency shifter 20 shown in FIG. 1. In this example, the relative frequency drift and jitter between the two laser frequencies should be substantially minimized to a level that minimizes or does not affect the accuracy and stability of the frequency shift, and thus rotational rate, measurement. This can be accomplished by laser frequency stabilization techniques, such as those that use electronic servos to lock their beat frequencies to a tunable stable offset (proportional to rotational rate). Each of the lasers 42, 44 sinusoidally frequency modulates the respective frequencies thereby replacing the frequency modulators 16, 18 shown in FIG. 1.

Figure 3:
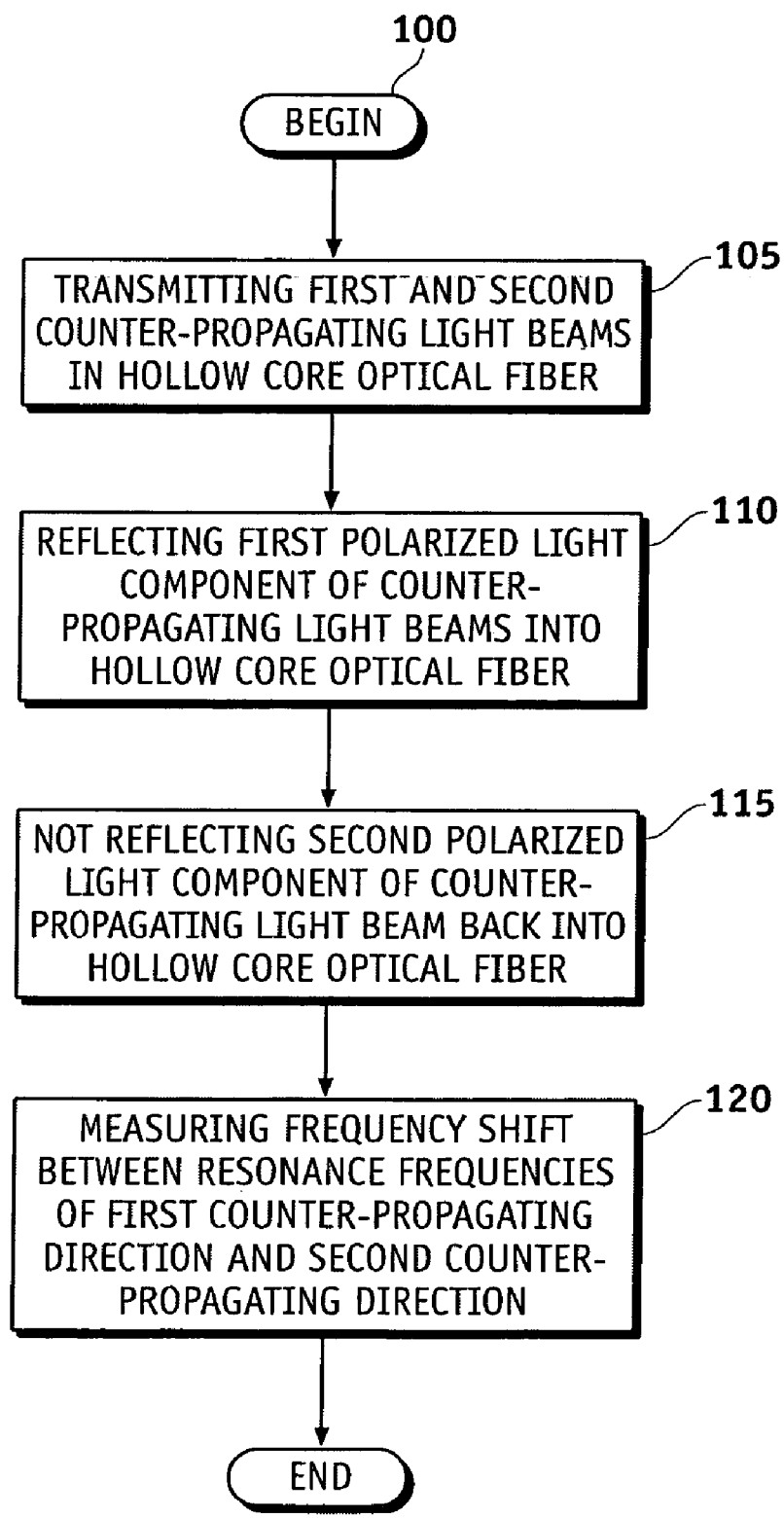
FIG. 3 is a flow diagram of a method for sensing a rotation rate of a ring resonator in accordance with an exemplary embodiment of the present invention.

FIG. 3 is a flow diagram of a method for sensing a rotation rate of a ring resonator in accordance with an exemplary embodiment of the present invention. The method begins at step 100. Referring to FIGS. 1 and 3, first and second counter-propagating light beams are transmitted into the hollow core optical fiber coil 24 at step 105. The recirculator 22 recirculates the first and second counter-propagating light beams through the hollow core optical fiber coil 24 while substantially removing light having the undesired polarization out of each of the first and second counter-propagating light beams in the resonator 25. In an exemplary embodiment, the polarization unit 23 reflects light emerging from the fiber having the desired polarization from each of the first and second counter-propagating light beams back into the hollow core optical fiber at step 110. Additionally, the polarization unit 23 passes light having the undesired polarization from each of the first and second counter-propagating light beams away from the hollow core optical fiber at step 115. The frequency shifter determines a frequency shift between the resonance frequency of the first counter-propagating light beam and the resonance frequency of the second counter-propagating light beam at step 120, and this frequency shift indicates the rotation rate of the ring resonator.

Advantages of the RFOG 10 include, but are not limited to: a capability of providing about a 0.01 deg/hr bias and about a 0.001 deg/root-hr angle random walk (ARW) in a low-cost, small-sized package; a resonator having less than a few meters of fiber wound into tight turns with low loss; use of a high reflectivity mirror rather than a fiber optic coupler to recirculate light in the ring resonator; a compact, stable laser whose key components can be mounted on a silicon optical bench; a MEMS prism embeddable in silicon that efficiently directs light in and out of silicon; minimized non-linear effects in silica fibers that may promote gyro errors; attenuated thermally-driven polarization errors by minimizing the drift (over temperature) of a potential second resonance peak corresponding to a second polarization mode in the optical fiber; substantial reduction of light loss at transition point to optical fiber coil 24; a capability of winding the optical fiber coil into a very tight (e.g., pencil diameter) loops with little to no change in light transmission properties.

In one exemplary embodiment, the RFOG 10 is constructed on a silicon-based micro-optical bench that integrates electronics and optics and provides an efficient, expedient, and mechanically stable interface between the two. Optical functions, such as associated with the wave modulators 16, 18, may be incorporated in waveguides located close to the surface of the optical bench, and miniature optical components having a feature size of as little as 10 microns may be mounted on silicon surfaces to eliminate large bulk optics, even though the light wave may be traveling in free space. Laser diodes and external elements for stabilizing their frequency may also be mounted on the top surface of the silicon optical bench. In this exemplary embodiment, the laser and related frequency tuning components may be mounted on the optical bench, and using the serrodyne method for frequency shifting enables the use of an integrated optical phase modulator in a silicon waveguide for the frequency shifter. A microelectromechanical system (MEMS) optical prism may be used as a highly reflective laser prism capable of directing light into and out of the silicon waveguide. The use of these techniques allows the fabrication of optics in a silicon platform and thus integrated with the electronics.

The RFOG 10 is suited to a variety of applications including, by way of example and not of limitation, applications requiring inertial guidance such as aircraft, land vehicle, submarine, satellite, surface ship navigation, and the like., In addition, the relatively small size envisioned for the RFOG 10 would enable a practical usage on very small platforms including, by way of example and not of limitation, small robots, individual soldier footwear, and small-scale satellites.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A ring resonator having first and second resonance frequencies, said ring resonator comprising:
   an optical fiber coil having a hollow core and first and second ends;
   a light beam generator coupled to said optical fiber coil and configured to generate first and second counter-propagating beams in said hollow core; and
   a light recirculator coupled to said first and second ends of said optical fiber coil and configured to direct a first light beam into said second end of said optical fiber coil, said first light beam based on one of said first and second counter-propagating beams, said light recirculator comprising:

a first polarizing unit configured to direct with a low loss a first polarized component of said first light beam into said second end and further configured to impart a high loss to a second polarized component of said first light beam.

2. A ring resonator according to claim 1, wherein said first polarizing unit comprises a thin film polarizing element.

3. A ring resonator according to claim 2, wherein said thin film polarizing element comprises a transparent substrate and a stack of dielectric coatings on said transparent substrate.

4. A ring resonator according to claim 1, wherein said first polarizing unit is further configured to reflect at least 95% of said first polarized component.

5. A ring resonator according to claim 1, wherein said first polarizing unit is further configured to receive said first light beam exiting said first end of said optical fiber coil at a predetermined angle of incidence.

6. A ring resonator according to claim 5, wherein said predetermined angle of incidence is about 56 degrees.

7. A ring resonator according to claim 1, wherein said light recirculator is further configured to direct a second light beam into said first end of said optical fiber, said second light beam propagating opposite said first light beam, and wherein said first polarizing unit is further configured to direct with a low loss a first polarized component of said second light beam into said first end and impart a high loss to a second polarized light of said second light beam.

8. A ring resonator according to claim 1, wherein said light recirculator is further configured to direct a second light beam into said first end of said optical fiber coil, and wherein said light recirculator further comprises a second polarizing unit configured to reflect a first polarized component of said second light beam and further configured to impart a high loss to a second polarized component of said second light beam.

9. A ring resonator according to claim 1, wherein said first counter-propagating beam has a frequency substantially matched to the first resonance frequency and said second counter-propagating beam has a frequency substantially matched to the second resonance frequency, wherein a difference between the first resonance frequency and the second resonance frequency indicates a rotation rate of said optical fiber coil, and wherein said first polarizing unit minimizes a light energy of said second polarized component in said optical fiber coil at about a resonance.

10. A resonator fiber optic gyro (RFOG) assembly comprising:
a beam generator;
an optical fiber coil having first and second ends coupled to said beam generator and having a hollow core, said beam generator configured to produce first and second counter-propagating light beams in said optical fiber coil, each of said first and second counter-propagating light beams having a frequency;
a polarizing unit coupled to said first and second ends of said optical fiber coil and configured to:
  reflect a first polarized component of said first and second counter-propagating light beams;
  recirculate said first polarized component of said first and second counter-propagating light beams; and
  prevent recirculation of a second polarized component said first and second counter-propagating light beams;
a first photodetector configured to determine a resonance center of a first direction of light propagation in said optical fiber coil;
a second photodetector configured to determine a resonance center of a second direction of light propagation in said optical fiber coil; and
a frequency shifter coupled to said second photodetector and configured to shift said frequency of said second counter-propagating light beam by a frequency $\Delta f$ to said resonance center of said second direction of light propagation in said optical fiber coil, said $\Delta f$ indicating a rotational rate of the RFOG.

11. An RFOG according to claim 10, wherein said polarizing unit comprises a thin film polarizing element.

12. An RFOG according to claim 11, wherein said thin film polarizing element comprising a transparent substrate and a stack of dielectric coatings on said transparent substrate.

13. An RFOG according to claim 10, wherein said polarizing unit is further configured to reflect at least 95% of said first polarized component.

14. An RFOG according to claim 10, wherein said polarizing unit is further configured to receive said first and second counter-propagating light beams at a predetermined angle of incidence.

15. An RFOG according to claim 14, wherein said predetermined angle of incidence is about 56 degrees.

16. An RFOG according to claim 10, wherein said polarizing unit comprises:
a first reflector configured to reflect said first polarized component of said first counter-propagating light beam and further configured to impart a high loss to said second polarized component of said first light beam; and
a second reflector configured to reflect said first polarized component of said second light beam and further configured to impart a high loss to said second polarized component of said second light beam.

17. A method for sensing a rotation rate of a ring resonator having a hollow core optical fiber, the method comprising the steps of:
transmitting first and second counter-propagating light beams into the hollow core optical fiber;
recirculating the first and second counter-propagating light beams through the hollow core optical fiber while substantially removing a first polarized component out of each of the first and second counter-propagating light beams; and
measuring a frequency shift between a first resonance frequency of a first direction of light propagation in the ring resonator and a second resonance frequency of a second direction of light propagation in the ring resonator, the frequency shift indicating the rotation rate.

18. A method according to claim 17, wherein said recirculating step comprises:
directing with a low loss a second polarized component of each of the first and second counter-propagating light beams back into the hollow core optical fiber; and
imparting a high loss to the first polarized component of each of the first and second counter-propagating light beams.

19. A method according to claim 18, wherein said reflecting step comprises reflecting at least 95% of the second polarized component of each of the first and second counter-propagating light beams back into the hollow core optical fiber.

20. A method according to claim 18, wherein said reflecting step comprises receiving each of the first and second counter-propagating light beams at an angle of incidence of about 56°.

* * * * *